United States Patent [19]

VanDonkelaar

[11] Patent Number: 5,721,421
[45] Date of Patent: Feb. 24, 1998

[54] APPARATUS AND METHOD FOR VERIFYING A SHELF TAG

[75] Inventor: Jon L. VanDonkelaar, Bellbrook, Ohio

[73] Assignee: Bass, Inc., Dayton, Ohio

[21] Appl. No.: 680,439

[22] Filed: Jul. 15, 1996

[51] Int. Cl.⁶ .................................................. G06K 7/10
[52] U.S. Cl. ................................................ 235/462; 235/472
[58] Field of Search .................................... 235/462, 472

[56] References Cited

U.S. PATENT DOCUMENTS

| | | | |
|---|---|---|---|
| 4,086,477 | 4/1978 | Cowardin et al. | 235/464 |
| 5,157,687 | 10/1992 | Tymes | 375/1 |
| 5,365,050 | 11/1994 | Worthington et al. | 235/472 |
| 5,410,141 | 4/1995 | Koenck et al. | 235/472 |

OTHER PUBLICATIONS

"New UHF Receiver Architecture Achieves High Sensitivity and Very Low Power Consumption", Darrel Lash, Published at RF Expo West, Jan. 1995.

*Primary Examiner*—F. L. Evans
*Attorney, Agent, or Firm*—Biebel & French

[57] ABSTRACT

A shelf tag verifying apparatus having a portable terminal unit in radio communication with a base station and in acoustic wave communication with a nearby bar code reader. The bar code reader reads a bar code printed upon a product which rests upon shelving marked by a tag requiring verification. A decoder mounted within the bar code reader generates a binary product code corresponding to the bar code and appends a check code. A SAWR transmitter then transmits the binary product code and the check code to an ASH receiver mounted in the terminal unit. A microprocessor mounted in the terminal unit verifies the check code and generates a query for radio transmission to the base station, whereupon the base station responds with information for verification of the shelf tag.

8 Claims, 3 Drawing Sheets

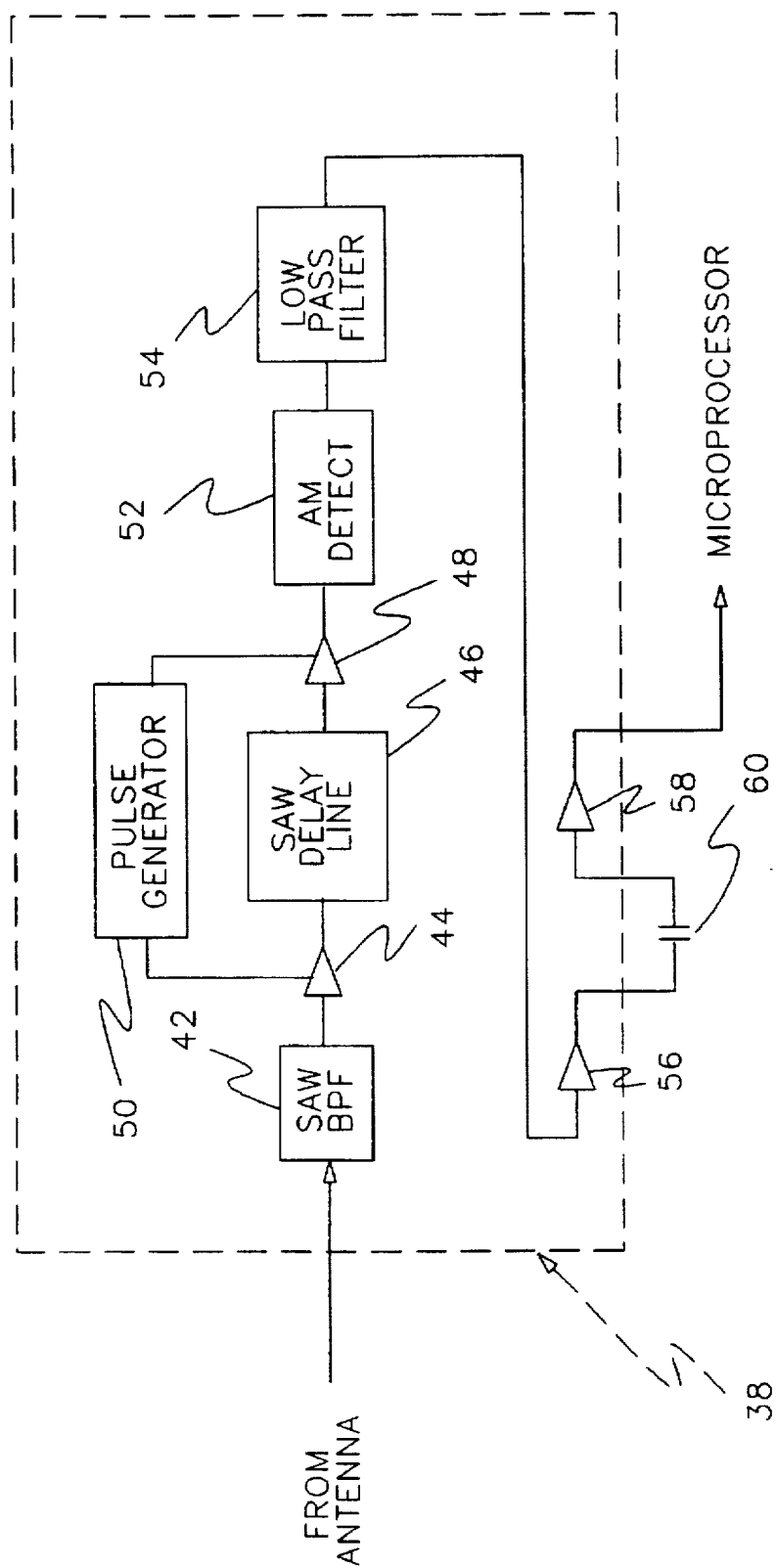

APPARATUS AND METHOD FOR VERIFYING A SHELF TAG

BACKGROUND OF THE INVENTION

This invention relates to the field of retail merchandising and more particularly to apparatus for verifying human readable information upon shelf tags.

In times past retail stores, particularly food markets, marked prices upon every item stocked on merchandising shelves. Customers were accustomed to reading the prices marked upon the products and comparing those prices against cash register receipts to verify the accuracy of the bill. However, in recent times there has developed a practice of printing bar codes upon nearly all types of packaged products. Such bar codes uniquely identify the products upon which they are placed and are positioned on the package in such a manner as to facilitate reading by scanners at point-of-sale terminals. Stores which are equipped with such terminals will relay the scanned bar codes to a central computer. This provides pricing information which is sent back to the inquiring terminal. Such merchandising requires no price marking on the product being sold, and therefore many stores have discontinued price marking all together. Consequently it has become necessary to provide shelf tags which display product identifying information and associated prices, all in human readable form. These shelf tags are easily damaged, moved or lost and are quickly outdated due to frequent price changes.

It will be appreciated that means must be provided for quickly verifying shelf tag information. Therefore stock clerks are issued bar code readers which are connected by cables to portable terminal units. A typical terminal unit has an internally mounted microprocessor and is equipped for radio communication with a base station located near the central computer. When a stock clerk wishes to verify a price appearing on a shelf tag, he uses his bar code reader to scan a bar code on one of the products in question. This generates a bar code sensing signal which is sent to the terminal unit. The microprocessor decodes the bar code sensing signal to create a corresponding binary code. This binary code is incorporated into a query which the terminal unit transmits to the base station for forwarding to the central computer. After the central computer receives the query, it checks a data base of pricing information and formulates a responsive message containing the requested price. That message is sent to the base station and relayed to the terminal unit for presentation on a built-in visual display.

During the course of a long work day a typical stock clerk may scan hundreds of bar codes, each time pulling the cable which connects his bar code reader to his terminal unit. This requires extra effort on the part of the stock clerk, due to three contributing factors. First there is the weight of the cable itself. Secondly there is the stiffness of the cable which resists the bending required for accommodating a lateral scan across a package label. Thirdly there are the frictional forces which are encountered whenever the cable drags across a shelf or other surface. While prior art, such as Worthington et. at. U.S. Pat. No. 5,365,050, suggests the use of low power cordless bar code scanners, such scanners transmit low power RF signals which are amplitude modulated by voltages from the scanning sensor. Most bar codes of current interest use the UPC format wherein numeric characters are represented by 2 light bars and two dark bars of varying widths. The entire bar code reading process involves sensing the varying light levels across the alternating light and dark bars, and transforming the light level variations into 8-bit binary codes.

The scanning process itself is quite noisy due to variations in: laser beam intensity, laser beam geometry, scanning direction, scanning speed, accuracy of printed bar widths, light bar reflectivity, dark bar reflectivity and foreign matter presence on the package. This degrades the digitizing process and may in certain circumstances make bar code reading quite difficult. However, the prior art cordless wand compounds the problem by adding RF noise to the scanning signal. Consequently the trade has generally steered clear of cordless wands and has endured the inconvenience of a cable or cord connection between the bar code scanner and the portable remote terminal or, alternatively, has incorporated the scanner into the terminal itself. However, this merely trades one set of problems for another. The integrated unit is considerably heavier than the bar code reading device alone, and while the clerk no longer has to drag a cord, the arms and wrists now have to manipulate a lot of weight while performing a bar code scan. It can be seen that there is a need for an improved shelf tag verification system.

SUMMARY OF THE INVENTION

This invention eliminates inconveniences associated with prior an shelf tag verification systems by transmitting bar codes from a bar code reader to a portable remote terminal in a binary coded format. The bar code reader includes a scanner for manually controlled scanning of printed bar codes, a decoder for decoding and digitizing output voltage levels from the scanner and a surface acoustic wave resonator for wireless transmission of output signals from the decoder to the portable remote terminal unit. A check code is also transmitted for verification of the signal. The portable remote terminal has an amplifier sequenced hybrid receiver for receiving output signals from the decoder and a microprocessor which checks the integrity of the received signals. When an accurate transmission is received, it is relayed by radio transmission to a base station. The base station forwards the transmission to a host computer which checks an information file, indexed according to bar codes, and routes the current product price or other appropriate information back to the portable remote terminal.

Accordingly, it is an object of the invention to provide an improved apparatus and method for verifying alphanumeric information appearing on tags affixed to shelving for bar coded products.

It is another object of the invention to enable improved verification of bar codes imprinted upon products.

Other objects and advantages of the invention will be apparent from the following description, the accompanying drawings and the appended claims.

BRIEF DESCRIPTION OF THE DRAWING

FIG. 3 is a schematic illustration of an amplifier-sequenced hybrid receiver.

FIG. 4 is a schematic illustration of a signal sent from a bar code scanner to a terminal unit.

DESCRIPTION OF THE PREFERRED EMBODIMENT

Figure 1:
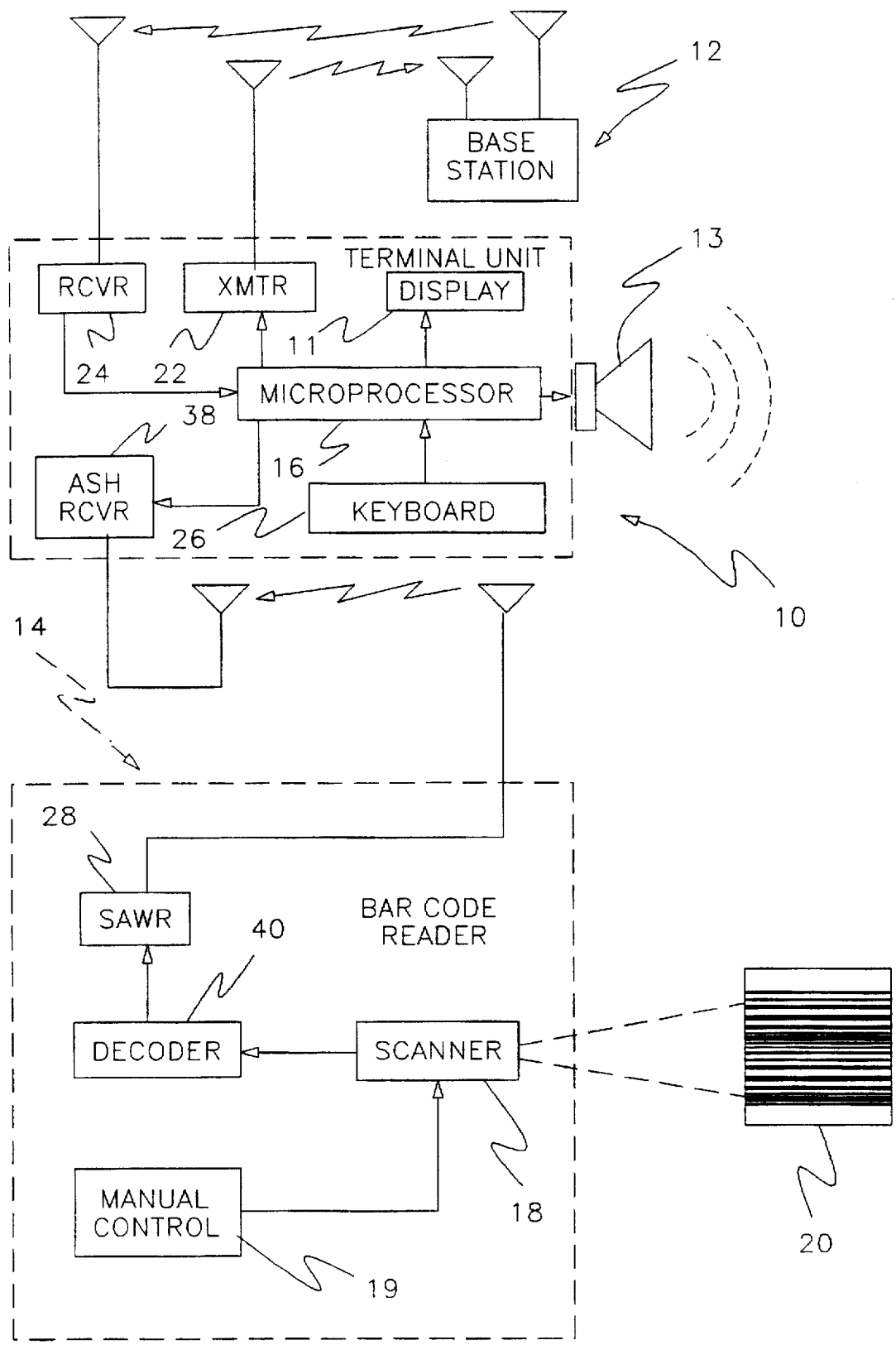
FIG. 1 is a schematic illustration of a shelf tag verifying system according to the present invention.

A shelf tag verifying system in accordance with the present invention may be configured as generally illustrated in FIG. 1. The system comprises a terminal unit 10 in communication with a bar code reader 14. Terminal unit 10 also communicates with a base station 12. Base station 12 is in communication with a host computer (not illustrated) which stores product information responsive to queries generated by terminal unit 10.

Terminal unit 10 comprises a microprocessor 16 which receives operator input from a keyboard 26 and which is connected for communication with an amplifier-sequenced hybrid (ASH) receiver 38, a radio transmitter 22, a radio receiver 24 and an indicating device 11 which may be a liquid crystal display, voice synthesizer or other unit capable of generating an indication recognizable by a human operator. Also shown on FIG. 1 is an audio unit 13 which generates a "beep" or other distinctive sound to indicate successful reception of a scanning signal from bar code reader 14. ASH receiver 38 receives binary coded radio signals corresponding to a bar code printed upon a label 20 and scanned by a scanner 18 mounted within bar code reader 14. Scanner 18 preferably comprises a laser, a power supply, scanning optics and a photodiode sensor, all of which are conventional and none of which are illustrated. Label 20 may be imprinted upon a product package and may identify the contents of the package. Scanner 18 is activated by a manual control 19, and bar code reader is manually swept along a path which directs a laser beam across label 20. Alternatively scanner 18 could generate a suitable scanning beam using a light emitting diode and appropriate collimating optics or a light source and CCD sensor.

As the laser beam is swept across label 20, light energy is reflected back toward scanner 18 and focussed upon the above mentioned photodiode. The photodiode then responds by generating a sensing signal which is amplitude modulated in accordance with variations in the intensity of the backwardly reflected radiation.

The sensing signal is routed from scanner 18 to a decoder 40 which also may be of conventional design. Decoder includes a threshold device, not illustrated, which converts the sensing signal into a simple square wave representing dark-to-light and light-to-dark transitions. A timing circuit examines the times between transitions and categorizes each bar into one of four possible widths. A simple logic arrangement examines the widths of bars in side-by-side bar groups (two light bars and two dark bars per group) and generates corresponding a binary product code in 8-bit bytes (ASCII format). The binary product code is then formatted into a transmission signal 125, as illustrated in FIG. 4 and thereafter used for ON/OFF modulation of an RF signal generated by a surface acoustic wave resonator circuit 28.

When the binary product code is received by ASH receiver 38, it is sent to microprocessor 16 and passed to transmitter 22 for transmission to base station 12. Base station 12 then forwards the code to a host computer (not illustrated) which uses it for entry into a data base of product information. This enables the host computer to prepare an informational message regarding the product for routing back to microprocessor 16 via base station 12 and receiver 24. Microprocessor 16 causes the message to be presented on display 11, so that the stock clerk may verify a shelf tag associated with the product.

As described in more detail below surface acoustic wave resonator 28 may generate radio signals at a frequency of 433.92 MHz. This frequency may be used at low power without a license from the government. A suitable resonator for such purposes is available from RF Monolithics, Inc. under part number R02101A. The signal generated by surface acoustic wave resonator 28 travels only a relatively short distance to reach terminal unit 10, typically less than about 10 feet.

The signal radiated by resonator 28 is received by amplifier sequenced hybrid receiver 38 which preferably may be a device of the type sold by RF Monolithics, Inc. under part number RX1020. All communications between resonator 28 and receiver 38 are on a simplex basis. That is, resonator 28 merely transmits signals without any indication of reception by receiver 38.

In normal operation the signals transmitted by resonator 28 may become degraded or corrupted for any of numerous reasons. Therefore decoder 40 performs a cyclic redundancy check (CRC) to generate a 16-bit check code. This involves an integer arithmetic operation wherein a binary polynomial is formed from the bits of the binary product code. This polynomial is divided by a predetermined 16-bit binary reference number, and the remainder is used as the check code. The division my be performed by placing the binary coefficients of the polynomial into a 16-bit wide shift register and repeatedly subtracting the predetermined reference number until a remainder is obtained. Hardware for performing such subtraction may comprise 16 parallel subtraction circuits, each consisting of an arrangement of 9 NAND gates. Such hardware is well known and need not further be described. Alternatively such a CRC check code could be produced by a microprocessor using software as described in a reference manual entitled "Asynchronous Communications Library for C" available from Greenleaf Software, Inc. of Dallas, Tex.

The information signal 25 modulates the RF signal generated by SAWR 28, so the binary product code and the check code are sent to ASH receiver 38. Microprocessor 16 stores the binary product code in a random access memory and uses it to calculate a 16-bit verifying code as a check against the check code appended to the transmitted data. If the check is successful, the Microprocessor 16 activates audio unit 13 to generate a beep and also transmits the product code to base station 12.

Figure 2:
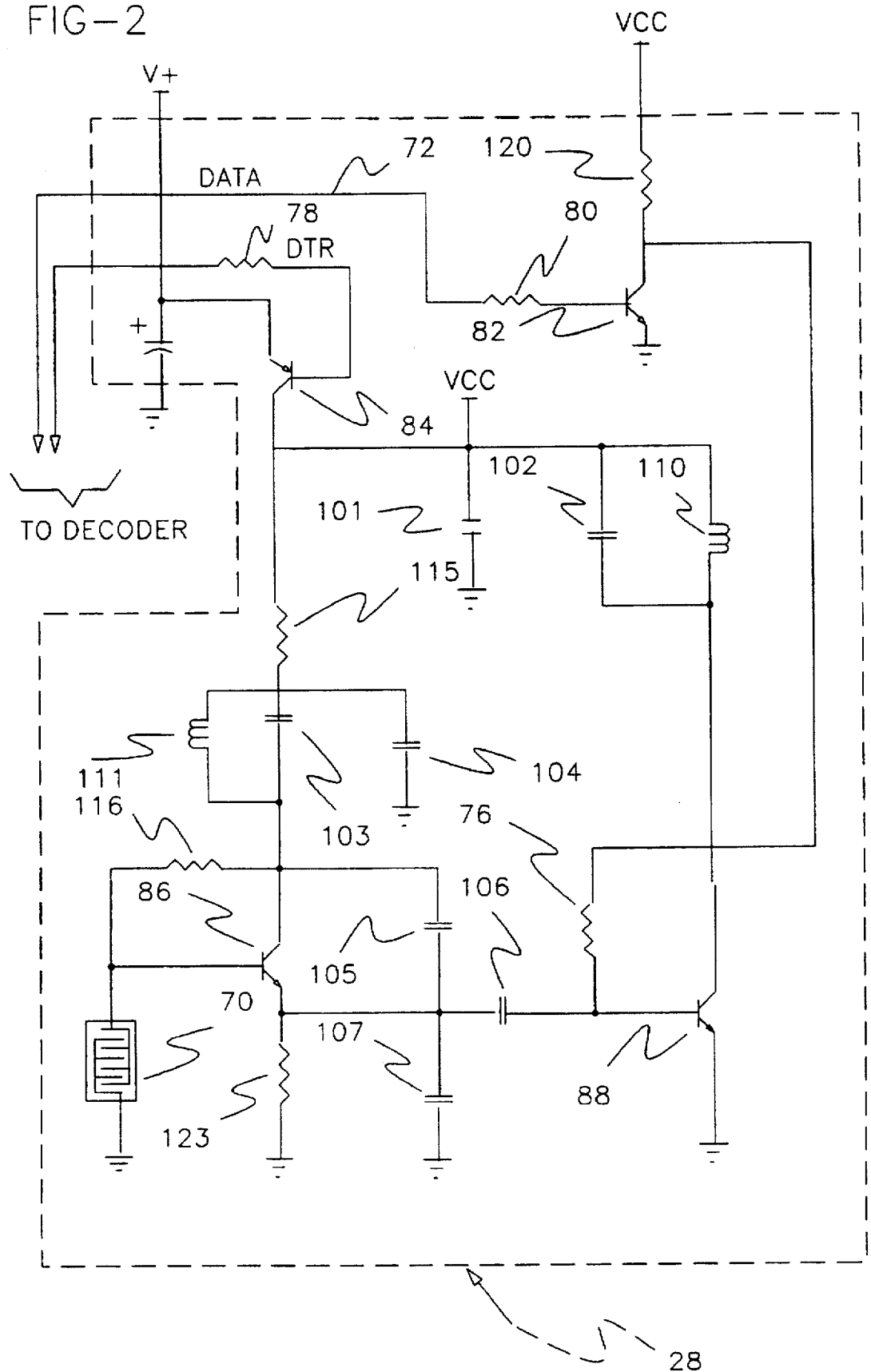
FIG. 2 is a schematic illustration of a surface acoustic wave resonator.

The details of resonator 28 are shown in FIG. 2. The key element of resonator 28 is a chip 70 which generates surface waves at a frequency of 433.92 MHz. Chip 70 is enabled by a DTR signal applied to line 74. The DTR signal is applied to a resistor 78 connected to the base of a transistor 84. The DTR signal causes transistor 84 to become conductive and supply current through a resistor 115 to an oscillation circuit comprising a transistor 86, resistors 116, 123 and capacitors 105, 107. This excites oscillations at a frequency of 433.92 MHz in transistor 86 and creates an alternating drive signal for the chip 70.

Data signals in the form of a series of zeros and ones are applied by decoder 40 to line 72 of resonator circuit 28. These data signals are applied through a resistor 80 to the base of a transistor 82. Transistor 82 is connected to a VCC supply through a resistor 120 and inverts the sign of the data appearing on data line 72. The inverted signal controls ON/OFF current conduction through transistor 88, which in turn applies a binary modulation envelope to the high frequency surface waves being generated by chip 70. Signal filtering is provided by capacitors 101, 102, 103, 104 and 106 and coils 110, 111 to line 72 of resonator circuit 28.

As previously stated, data signals appearing on line 72 are inverted before modulating the RF signal produced by circuit 70. The modulated signal is received by receiver 38 and again inverted in the process. This produces control signals for microprocessor 16 which have the same boolean sense as the control signals on line 72.

Referring now to FIG. 3, modulated signals received from resonator 28 are connected to a surface acoustic wave device 42 connected for use as a band pass filter 42. Output signals from band pass filter 42 are applied to an RF amplifier 44 which is turned on by a pulse generator 50. The output of RF amplifier 44 is applied to the input of a surface acoustic wave delay line 46. When the signal emerges from delay line 46, then pulse generator 50 turns off RF amplifier 44 and turns on a second RF amplifier 48. Output signals from second RF amplifier 48 are applied to an AM detector 52 and then are filtered by a low pass filter 54. This removes the carrier frequency and provides a baseband output which is amplified by an amplifier 56. The baseband output signal from amplifier 56 is raw demodulated, unprocessed data. The level of this data is dependant upon the input RF level. This signal is capacitively coupled via a capacitor 60 to the input of a comparator 58 and then is relayed to microprocessor 16 for initiation of an information exchange which will enable verification of a shelf tag.

As described above, the invention has application to a supermarket environment. However, it will be appreciated that it may be used in warehouses and in other settings involving high volume hand manipulation of a product code sensor.

While the forms of apparatus herein described constitute preferred embodiments of the invention, it is to be understood that the invention is not limited to these precise forms of apparatus, and that changes may be made therein without departing from the scope of the invention.

What is claimed is:

1. Shelf tag verification apparatus comprising:
   (a) a portable product code reader including:
      (1) a scanner for scanning a product marked by a machine readable identifying code and generating an analog signal corresponding to light and dark gradations thereof,
      (2) a decoder connected to said scanner for receiving said analog signal, generating a corresponding binary product code, and calculating a check code based upon said binary product code and a predetermined reference code,
      (3) a surface acoustic wave resonator connected for generating a radio frequency signal and using said binary product code and said check code to modulate said radio frequency signal; and
   (b) a hand-held terminal unit including:
      (1) an amplifier sequenced hybrid receiver for receiving said radio frequency signal and reproducing said binary product code and said check code,
      (2) a microprocessor connected to said amplifier sequenced hybrid receiver for receiving said binary product code, calculating a verifying code therefor, comparing said verifying code against said check code and unloading said binary product code in the event of a satisfactory check,
      (3) a radio transmitter connected for receiving said binary product code from said microprocessor and transmitting a corresponding radio signal to a base station,
      (4) a radio receiver for receiving a responsive radio transmission from a base station and supplying said responsive radio transmission to said microprocessor, and
      (5) an indicating device connected to said microprocessor for creating an indication of said responsive radio transmission in a form recognizable to a human operator.

2. Apparatus according to claim 1 further comprising an audio unit mounted in said terminal unit for generating an audio signal to indicate successful verification of said binary product code by said microprocessor.

3. Apparatus for product identification comprising:
   (a) a scanner for scanning a product marked by a machine readable identifying code and generating an analog signal corresponding to light and dark gradations thereof,
   (b) a decoder fixed to said scanner for receiving said analog signal and generating a corresponding binary product code and a check code therefor,
   (c) a surface acoustic wave resonator connected for receiving said binary product code and said check code and radiating a corresponding radio frequency message,
   (d) an amplifier sequenced hybrid receiver for receiving said radio frequency message, and
   (e) a microprocessor for verifying said check code and selectively processing said binary product code when said check code is satisfactorily verified.

4. Apparatus according to claim 3 further comprising a radio transmitter connected for receiving said binary product code from said microprocessor and transmitting a corresponding radio signal to a base station.

5. Apparatus according to claim 4 further comprising an audio unit for generating a distinctive sound when said microprocessor has verified said check code.

6. A method of verifying information printed on a shelf tag comprising the steps of:
   (1) generating a bar code signal by sweeping a bar code sensor across a bar code imprinted upon a package associated with said shelf tag,
   (2) generating a binary product code by decoding said bar code signal,
   (3) using said binary product code and a predetermined reference code to generate a check code,
   (4) causing a surface acoustic wave resonator to radiate a radio frequency signal,
   (5) using said binary product code and said check code to modulate said radio frequency signal,
   (6) at a vicinity adjacent said shelf tag, receiving said radio frequency, modulated as aforesaid,
   (7) at said vicinity, recovering said binary product code and said check code by demodulating said radio frequency signal,
   (8) at said vicinity, using said binary product code, recovered as aforesaid, and said predetermined code to generate a verifying code,
   (9) at said vicinity, verifying said check code, recovered as aforesaid, by comparison against said verifying code,
   (10) transmitting said binary product code, recovered as aforesaid, from said vicinity to a base station, only in the event that said verifying step produces a result previously determined to be satisfactory,
   (11) using said binary product code, recovered and transmitted as aforesaid, to create a message relating to said package,
   (12) transmitting said message from said base station to said vicinity, and
   (13) displaying said message at said vicinity.

7. Method according to claim 6 wherein a cyclic redundancy check is performed for generation of said check code and said verifying code.

8. Method according to claim 7 further comprising the step of signaling satisfactory performance of said verifying step by generating an audible signal.

* * * * *